Oct. 12, 1965  R. L. MAIER ETAL  3,210,956
EVAPORATOR UNIT FOR VEHICLE AIR CONDITIONING SYSTEMS
Filed Aug. 7, 1963  2 Sheets-Sheet 1
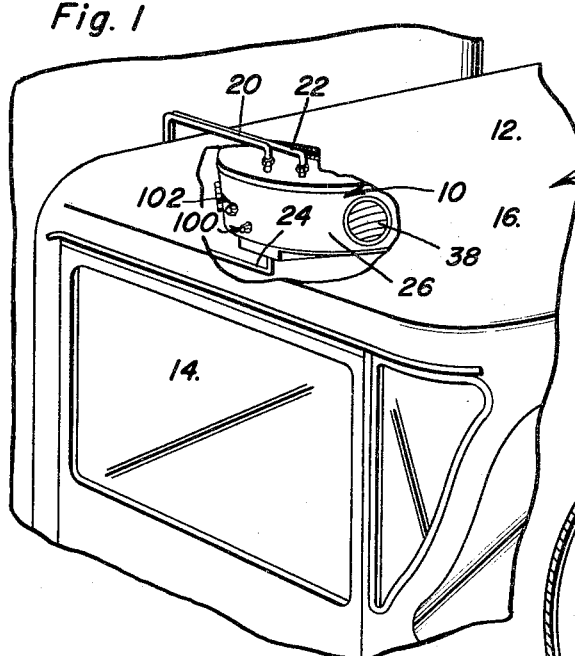
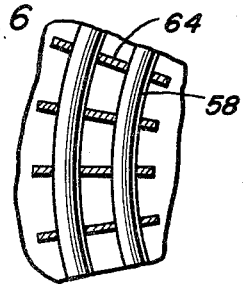
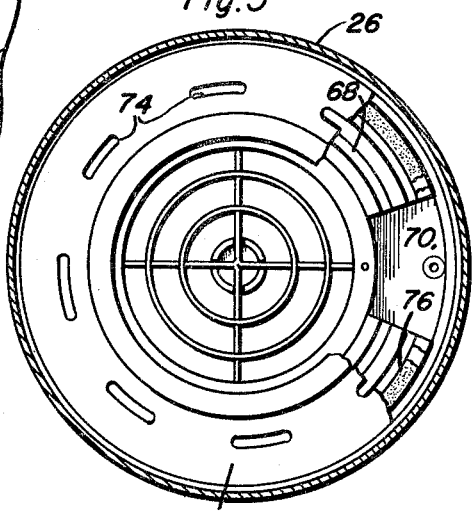
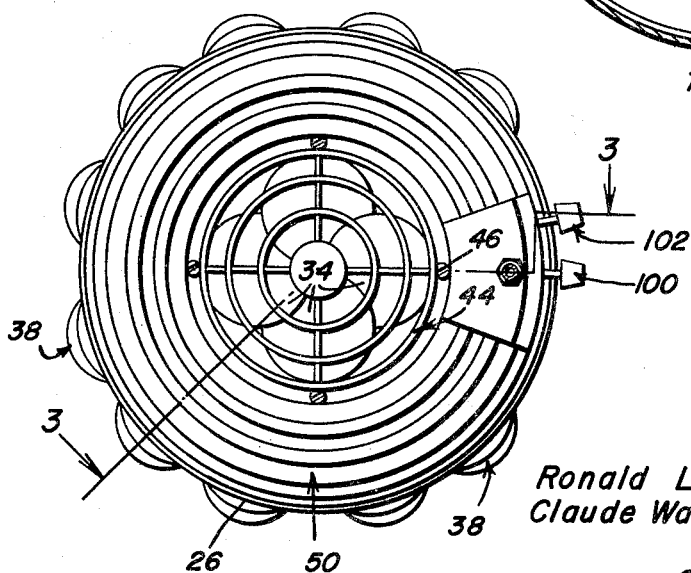
Ronald L. Maier
Claude Warren Dawkins
INVENTORS
BY *[signatures]*
Attorneys Oct. 12, 1965
R. L. MAIER ETAL
3,210,956
EVAPORATOR UNIT FOR VEHICLE AIR CONDITIONING SYSTEMS
Filed Aug. 7, 1963
2 Sheets-Sheet 2
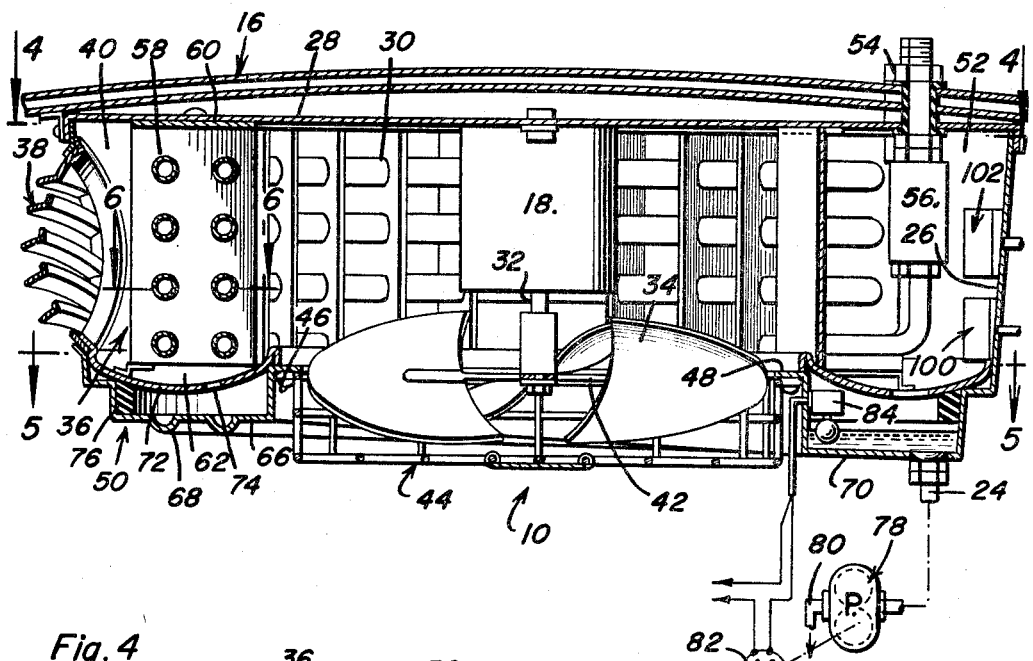
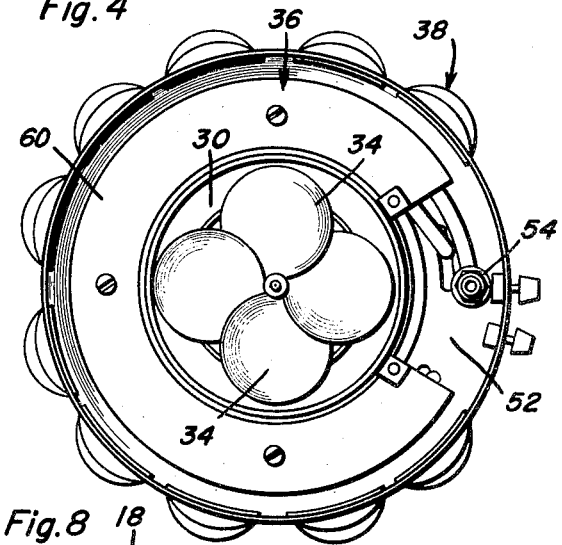
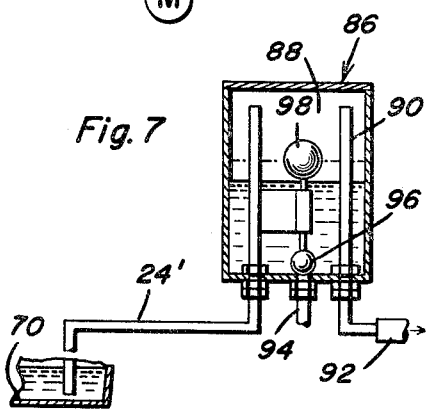
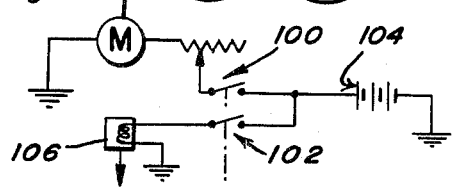
Ronald L. Maier
Claude Warren Dawkins
INVENTORS
BY
Attorneys United States Patent Office 3,210,956
Patented Oct. 12, 1965

3,210,956
EVAPORATOR UNIT FOR VEHICLE AIR
CONDITIONING SYSTEMS
Ronald L. Maier and Claude Warren Dawkins, Oklahoma City, Okla., assignors to Fleet Air Manufacturing, Inc., Oklahoma City, Okla., a corporation of Oklahoma
Filed Aug. 7, 1963, Ser. No. 300,495
12 Claims. (Cl. 62—186)

This invention relates to air conditioning systems for mobile vehicles such as trucks, taxi cabs, automobiles, delivery vans, farm implements, etc.

The present invention is more particularly concerned with the installation and operation of a refrigerant evaporating unit associated with the air conditioning system for an air conditioned space within the vehicle. The construction, installation and operation of the evaporating unit therefore includes features which are significant in connection with the environment of a mobile vehicle. The evaporating unit wherein novelty of the present invention resides, may therefore be associated with a compressor driven by the vehicle engine by means of which refrigerant is delivered to the evaporating unit for circulation therethrough in a condition adapted to absorb heat through heat exchange with the air flow. The evaporating unit may also be associated with a refrigerant condensing unit by means of which the heat absorbed by the refrigerant is removed from the air conditioning circuit, including condensing units adapted to be mounted on the roof of a vehicle cab such as disclosed in copending application Serial No. 210,420, filed July 17, 1962, now Patent No. 3,163,995.

It is therefore a primary object of the present invention to provide an air conditioning evaporating unit which is mounted directly on the ceiling enclosing an air conditioned space within a vehicle so as to expose an evaporating coil assembly to an induced flow of air within the air conditioned space itself.

Another object of the present invention is to provide an evaporating unit within which heat is removed from a radial discharge flow of air by heat exchange with evaporating coils within the air conditioned space, selectively adjusted louvered means being provided for controlling the direction and discharge of the air after heat exchange with the evaporating coils.

A further object of the present invention is to provide an evaporating unit mounted entirely within an air conditioned space directly on the ceiling thereof and being provided with condensate collection facilities and separate condensate removal facilities necessary in connection with the vehicular installation of the air conditioning system.

An additional object of the present invention is to provide an evaporating unit for a vehicle air conditioning system mounted entirely within the air conditioned space of the vehicle and on the ceiling thereof, including condensate collection means having an anti-splash feature whereby spillage of condensate is prevented as would otherwise occur because of rapid or abrupt accelerations, stoppage or severe turns.

A still further object of the present invention is to provide an evaporating unit for the air conditioned space of a vehicle having separate condensate removal facilities featuring as one embodiment, a condensate removal pump in the form of a vacuum chamber continuously maintained under suction pressure by a vacuum pressure developed by the vehicle engine so that liquid collected within the evaporating unit may be accumulated in the vacuum chamber until a predetermined level is attained at which point, a float controlled valve is opened for draining the vacuum chamber.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial perspective view with parts broken away showing the installation of an evaporating unit made in accordance with the present invention, in a mobile vehicle.

FIGURE 2 is a bottom plan view of the evaporating unit illustrated in FIGURE 1.

FIGURE 3 is a sectional view of the evaporating unit taken substantially through a plane indicated by section line 3—3 in FIGURE 2.

FIGURE 4 is a top plan sectional view taken substantially through a plane indicated by section line 4—4 in FIGURE 3.

FIGURE 5 is a transverse sectional view with parts broken away, taken substantially through a plane indicated by section line 5—5 in FIGURE 3.

FIGURE 6 is a partial sectional view taken substantially through a plane indicated by section line 6—6 in FIGURE 3.

FIGURE 7 is a partial sectional view showing another form of condensate removal apparatus associated with the evaporating unit.

FIGURE 8 is a simplified electrical circuit diagram illustrating the control system associated with the evaporating unit.

Referring now to the drawings in detail, it will be observed from FIGURE 1, that the evaporating unit of the present invention generally referred to by reference numeral 10 may be installed in any mobile vehicle such as vehicle 12 having an air conditioned space 14 such as the cab compartment of the vehicle enclosed by a ceiling structure 16 on which the unit 10 is mounted within the air conditioned space itself. Also connected to the evaporating unit, is a refrigerant supply tube 20 and a refrigerant outlet tube 22. The outlet tube 22 may therefore be connected to the inlet of a compressor (not shown) that may for example be driven by the vehicle engine while the supply tube 20 may be connected to the discharge of a condenser unit (not shown) associated in the usual manner with the air conditioning system as aforementioned whereby refrigerant in the air conditioning system is circulated through the coil assembly associated with the evaporating unit so as to absorb heat by heat exchange with the air being cooled within the air conditioned space. Also associated with the evaporating unit, for positive removal of condensate collected therein, is a condensate pick up tube 24 connected to a suitable pump apparatus as will hereinafter be explained.

Referring now to FIGURES 2 and 3 in particular, it will be observed that the evaporator unit is housed within an annular casing 26 the upper end of which is closed by a circular end wall member 28 secured in any suitable fashion to the ceiling structure 16 and provided with a central opening through which the motor 18 projects. The casing 26 thereby encloses a central inlet chamber 30 disposed entirely within the air conditioned space itself and into which the motor shaft 32 extends. Connected to the lower axial end of the motor shaft, is a flow inducing fan blade assembly 34 arranged in response to rotation thereof, to induce an axial inlet flow of air which is discharged radially through an annular coil assembly generally referred to by reference numeral 36 that encircles the inlet chamber 30 within the casing 26. The air is thereby cooled when passing through the coil assembly and is discharged through a plurality of selectively adjustable louvered outlet assembles 38 which are mounted on the casing 26 in circumferentially spaced relation to each other. Air may therefore be selectively directed upwardly or downwardly from peripherally spaced locations on the evaporator unit, or selected outlet assemblies 38 completely closed so as to confine discharge in any desired direction. The louvered outlet assemblies 38 are therefore radially spaced from the annular coil assembly 36 so as to form an annular discharge chamber 40 within the casing 26. The warmer inflow of air into the inlet chamber 30 on the other hand, is received through a circular opening 42 closed by an inlet guard 44 just below the fan blade assembly 34. The guard 44 is mounted by fasteners 46 on a radially inner flange portion 48 of a condensate collecting hull formation 50 secured to the lower end of the casing 26 in coaxial relation to the guard 44. The condensate collecting formation 50 is annular in shape so as to be disposed below the annular coil assembly 36 in order to collect condensate therefrom derived from the air being cooled.

As more clearly seen in FIGURES 3 and 4, the annular coil assembly circumferentially extends about the inlet chamber 30 less than 360° or about 300° so as to leave an arcuate space 52 through which connections are made to the supply and outlet conduits 20 and 22 aforementioned. Accordingly, the supply conduit 20 is connected through fitting 54 to a refrigerant expansion valve 56 which in turn is connected to one end of an elongated coil formation the other end of which is connected through a fitting to the outlet tube 22. The coil formation 58 forms a plurality of axially spaced coil sections supported by an upper annular plate 60 having connected thereto, a plurality of spaced radial fin members 64 as more clearly seen in FIGURE 6. In this manner, the radial discharge of air from the fan blade assembly is directed over the coils and heat transfer thereto is enhanced.

The condensate collecting formation 50 as more clearly seen in FIGURES 2, 3 and 5, includes an annular trough member 66 provided with a pair of channel formations 68 which slope toward a sump formation 70 slightly greater in depth than the trough formation 66. The sump 70 is therefore exposed below the space 52 where the ends of the coil sections of the coil assembly are connected to the supply and outlet conduits. It will therefore be apparent, that water or liquid will drip from the coil assembly and be collected within the trough member 66 so that it may be conducted by the channels 68 toward the sump formation 70. In order to prevent the spillage of condensate from the condensate collecting formation 50, an annular dished splash shield 72 is mounted within the trough member 66 and secured in place by cement. A plurality of circumferentially spaced drain holes 74 are formed in the splash shield so that condensate from the coil assembly may collect within the trough 66 and be confined therewithin. An annular sponge-like member 76 is seated within the trough 66 about the radially annular wall thereof so as to seal the liquid collecting chamber below the shield. When water collects within the trough 66 and the sump 70 to a predetermined level, it is withdrawn by separate condensate removal apparatus associated with the evaporator unit.

As shown in FIGURE 3, positive withdrawal of the condensate from the sump 70 may be effected by connecting the condensate pick up tube 24 which extends from the bottom of the sump 70, to a condensate discharge pump 78 having a discharge outlet 80 for draining the condensate. The pump 78 may therefore be driven by a pump motor 82 intermittently energized when the liquid within the sump 70 attains a predetermined level. Toward this end, a float controlled solenoid switch 84 may be mounted within the sump chamber 70 and electrically wired to the motor 82 and to a source of electrical power such as the battery or generator associated with the vehicle within which the evaporator unit is installed. Alternatively, withdrawal of liquid from the sump 70 through the pick up tube 24, may be effected by a vacuum type pump apparatus generally referred to by reference numeral 86 as illustrated in FIGURE 7. The vacuum pump unit 86 therefore includes a vacuum chamber 88 to which the pick up tube 24 is connected. Suction pressure will therefore be applied to the pick up tube 24 in order to withdraw liquid from the sump 70. The vacuum pressure within the chamber 88 is continuously maintained by a suction tube 90 connected by a flexible hose 92 to any suitable source of vacuum pressure such as the intake manifold of the engine associated with the vehicle. The ends of the pick up tube 24 and vacuum tube 90 are therefore disposed within the upper portion of the vacuum chamber 88 well above the maximum level of liquid accumulated within the vacuum chamber. The vacuum chamber is therefore provided with a drain outlet 94 at the bottom thereof normally maintained closed by a drain valve 96. The drain valve is slidably mounted and connected at its upper end to a float element 98 so that when the level of liquid accumulated within the vacuum chamber reaches the maximum level aforementioned, the drain valve 96 is opened so as to permit drainage of accumulated liquid.

From the foregoing description, the construction installation and operation of the evaporator unit will be apparent. Thus, when the fan motor 18 is energized, rotation of the blade assembly 34 will pull air upwardly through the fan guard 44 into the inlet chamber from which it is discharged in radial directions through the annular coil assembly 36. The discharge of air thereby cooled may be selectively controlled directionwise through the angularly adjustable louvered outlets 38. Also, condensate from the coil assembly will be collected within the annular trough 66 and sump 70 from which it is intermittently withdrawn in a positive manner by separate condensate removing pump apparatus. Operation of the evaporator unit may be selectively controlled with respect to air flow by means of a rheostat switch device 100. Cooling control may also be selectively regulated through use of a thermostat control device 102. The control devices 100 and 102 may therefore be mounted on the casing 36 between two of the louvered outlets 38. Referring therefore to FIGURE 8, it will be observed that the rheostat control device 100 may be utilized to vary the speed of the fan motor 18 connected to a source of electrical power 104. The motor 18 may thereby be turned on and off and its speed preset by means of the rheostat control device 100 so as to control the volumetric flow of air through the evaporator unit. Circulation or refrigerant by the compressor may be stopped when the temperature of the air stream discharged from the coil assembly reaches an adjusted preset temperature by disabling the compressor drive. Toward this end, the source of electrical power 104 may be connected by the manually adjusted thermostat switch 102 to the coil of an electromagnetic clutch device 106 by means of which the compressor motor is connected to the engine of the vehicle. At the preset temperature, the thermostat switch 102 will open so as to deenergize the electromagnetic clutch device 106 in order to disable the compressor motor drive in any suitable or equivalent manner. It will be appreciated, that the direct mounting of the evaporator unit on the ceiling of the air conditioned compartment with facilities for collecting condensate therein, is a particularly convenient arrangement for vehicle installation. Furthermore, the anti-splash feature and the provision of a separate and positive condensate removal pump apparatus renders the evaporator unit particularly useful for vehicle installation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an air conditioning system for vehicles having an air conditioned space enclosed by a ceiling structure, an evaporator unit within said air conditioned space comprising, an annular coil assembly fixedly mounted directly on the ceiling structure, flow inducing means mounted within the coil assembly below the ceiling structure for directing an axial inflow of air into the coil assembly, outlet means mounted on the ceiling structure having openings circumferentially surrounding the annular coil assembly for directing radial outflow of air from the coil assembly, and condensate collection means mounted on the outlet means below the coil assembly in sealed relation thereto.

2. The combination of claim 1 wherein said condensate collection means comprises, an annular trough having a sump portion and annular channels communicating with said sump portion for gravitationally directing liquid thereinto, shield means having circumferentially spaced drain holes mounted in said annular trough below the coil assembly for confining liquid in said channels and said sump portion, and condensate removal means connected to said sump portion.

3. In an air conditioning system for mobile vehicles having an air conditioned space enclosed by a ceiling structure, an evaporator unit comprising, an annular coil assembly fixedly mounted on the ceiling structure within the air conditioned space, rotatable flow inducing means mounted within the coil assembly below the ceiling structure for directing a flow of air radially through the coil assembly for heat exchange therewith, outlet means mounted in peripherally spaced relation to the coil assembly for selectively directing discharge of air into the air conditioned space after heat exchange with the coil assembly, and condensate collection means mounted below the coil assembly, said condensate collection means comprising, an annular trough having a sump portion and annular channels communicating with said sump portion for directing liquid thereinto, shield means having circumferentially spaced drain holes mounted in said annular trough below the coil assembly for confining liquid therebelow, and condensate removal means connected to said sump portion, said condensate removal means comprising, discharge pump means rendered operative in response to a predetermined level of liquid in the sump portion, and a pick up tube connecting said sump portion to the pump means for withdrawal of liquid when the pump means is rendered operative, said pump means comprising, a vacuum chamber connected to said pick up tube for applying suction pressure thereto to withdraw liquid from the sump portion, means connected to the vacuum chamber for continuously maintaining the vacuum chamber under suction pressure, and means responsive to accumulation of a predetermined level of liquid in the vacuum chamber for draining the liquid therefrom.

4. The combination of claim 3 wherein said coil assembly comprises a plurality of axially spaced coil sections extending circumferentially above the condensate collection means by less than 360° to expose the sump portion therebelow, refrigerant conducting means connected to the coil sections above the sump portion, and a plurality of radial fins supporting the coil sections in encircling relation to an inlet chamber within which said flow inducing means is located.

5. The combination of claim 4 wherein said flow inducing means includes a radial discharge fan mounted for rotation about an axis coaxial with said coil assembly, said fan being driven by a motor mounted in the ceiling structure, and an axial inflow guard mounted below the fan on the condensate collection means in coaxial relation thereto.

6. The combination of claim 5 including an annular casing to which said condensate collection means is connected and within which the coil assembly is supported, said outlet means being mounted on said casing, means mounting the casing directly on the ceiling structure and selective control means mounted on the casing between the outlet means.

7. The combination of claim 6 wherein said selective control means includes, adjustable rheostat means operatively connected to the motor for varying the rotational speed of the flow inducing means and adjustable thermostat means for disabling the flow inducing means in response to a preset temperature of the air discharged from the coil assembly.

8. The combination of claim 1 wherein said coil assembly comprises a plurality of axially spaced coil sections extending circumferentially above the condensate collection means by less than 360° to expose a sump portion therebelow, refrigerant conducting means connected to the coil sections above the sump portion, and a plurality of radial fins supporting the coil sections in axial alignment with said openings of the outlet means.

9. In an air conditioning system for a space enclosed below a ceiling structure, an evaporator unit comprising an annular casing secured to said ceiling structure and having a plurality of circumferentially spaced outlet openings, an annular coil assembly enclosed within said casing, condensate collection means connected to said casing supporting the coil assembly in axial alignment with the outlet openings therein, flow inducing means mounted within the coil assembly for producing a forced flow of air radially through the coil assembly directly above the condensate collection means, anti-splash means mounted by the casing and extending below the coil assembly into the condensate collection means, and means sealing the condensate collection means to the anti-splash means for preventing outflow of collected condensate into said forced flow of air within the casing.

10. The combination of claim 9 wherein said anti-splash means comprises an annular splash shield having circumferentially spaced drain holes through which condensate drains into the condensate collection means.

11. The combination of claim 10 wherein said condensate collection means comprises, an arcuate trough, a sump chamber connected to said trough, and channel means formed in said trough for gravitationally directing condensate into said sump chamber.

12. The combination of claim 9 wherein said condensate collection means comprises, an arcuate trough, a sump chamber connected to said trough, and channel means formed in said trough for gravitationally directing condensate into said sump chamber.

References Cited by the Examiner

UNITED STATES PATENTS

| | | | |
|---|---|---|---|
| 2,162,152 | 6/39 | Wulle | 62—244 |
| 2,728,206 | 12/55 | Newton et al. | 62—288 |
| 2,871,677 | 2/59 | Bradfield et al. | 62—239 |
| 2,895,313 | 7/59 | Flick | 62—244 |
| 3,007,323 | 11/61 | Millington et al. | 62—244 |
| 3,057,171 | 10/62 | Hulse et al. | 62—244 |
| 3,077,745 | 2/63 | Grantham et al. | 62—52 |

WILLIAM J. WYE, *Primary Examiner.*

ROBERT A. O'LEARY, *Examiner.*